United States Patent
Thomason et al.

(10) Patent No.: US 7,387,285 B2
(45) Date of Patent: Jun. 17, 2008

(54) METHOD AND APPARATUS FOR ATTACHING AN ITEM TO A RAILING

(75) Inventors: Rodger D. Thomason, Santa Monica, CA (US); William P. Conley, Calabasas, CA (US)

(73) Assignee: Kids Line, LLC, South Gate, CA (US)

( * ) Notice: Subject to any disclaimer, the term of this patent is extended or adjusted under 35 U.S.C. 154(b) by 329 days.

(21) Appl. No.: 11/065,508

(22) Filed: Feb. 24, 2005

(65) Prior Publication Data

US 2006/0186298 A1    Aug. 24, 2006

(51) Int. Cl.
*F21V 35/00* (2006.01)
(52) U.S. Cl. ............. 248/226.11; 248/103; 248/222.12; 248/231.41; 403/326; 403/329; 411/216; 411/383
(58) Field of Classification Search ................. 446/227, 446/228, 229, 236, 242; 5/93.1, 97, 503.1; 411/216–220, 321, 383; 248/222.12, 227.2, 248/103, 223.41, 226.11, 231.9, 227.4, 316.1, 248/231.41; 403/326, 329, 330
See application file for complete search history.

(56) References Cited

U.S. PATENT DOCUMENTS

| | | | |
|---|---|---|---|
| 1,083,133 A | 12/1913 | Powers | |
| 3,379,090 A | 4/1968 | Parkin | |
| 3,474,846 A | 10/1969 | Bien | |
| 3,978,610 A | 9/1976 | Stubbmann | |
| 4,573,654 A * | 3/1986 | Nottingham | 248/223.41 |
| 4,626,224 A * | 12/1986 | Benson et al. | 446/297 |
| 4,640,034 A | 2/1987 | Zisholtz | |
| 4,684,305 A | 8/1987 | Dubost | |
| 4,717,100 A | 1/1988 | Klein | |
| 4,730,967 A | 3/1988 | Warkentin | |
| 4,854,796 A * | 8/1989 | Wise | 411/427 |
| 4,904,220 A | 2/1990 | Williams et al. | |
| 5,352,145 A | 10/1994 | Raiffe et al. | |
| 5,370,570 A | 12/1994 | Harris | |
| 5,480,340 A * | 1/1996 | Bogar | 446/227 |
| 6,099,377 A | 8/2000 | Pridemore | |
| 6,113,455 A | 9/2000 | Whelan et al. | |
| 6,299,117 B1 | 10/2001 | Lin | |
| 6,357,707 B1 | 3/2002 | Lindsay | |
| 6,413,141 B1 | 7/2002 | Putney | |
| 6,464,555 B1 | 10/2002 | Paduano | |
| 6,658,678 B2 | 12/2003 | Hotaling et al. | 5/503.1 |
| 6,705,950 B2 | 3/2004 | Wood et al. | 472/118 |
| 6,769,952 B1 | 8/2004 | Drosendahl et al. | 446/227 |
| 2003/0189145 A1 | 10/2003 | Lindsay | 248/226.11 |

* cited by examiner

*Primary Examiner*—Korie Chan
(74) *Attorney, Agent, or Firm*—Sidley Austin LLP

(57) ABSTRACT

A clamp is provided suitable for clamping an object to a balustrade or other analogous structure. The clamp is attached by clamping the slats or spindles in the balustrade between a clamping nut and an adjustable jam plate. When the clamping nut is disengaged from the clamp, the jam plate may be slide along a shaft to position the jam plate. When the clamping nut is engaged with the clamp, the jam plate is locked in place on the shaft.

19 Claims, 6 Drawing Sheets

METHOD AND APPARATUS FOR ATTACHING AN ITEM TO A RAILING

The present invention relates to methods and apparatus for securely fastening an item to a balustrade or other analogous structure, and more particularly to methods and apparatus for securely fastening an item to the side of a baby crib.

BACKGROUND OF THE INVENTION

There is often a need to be able to securely, yet removably, mount an object to a structure made up of a series of spaced apart spindles or slats. For example, it may be desirable to attach a flower box to a porch railing. Many mobiles, music boxes, hanging toys, and other devices are intended to be fastened to the side of a crib. Typically, a clamp is used to fasten the device to the side of the crib. The clamp for mounting the product to the crib must be secure, and be adjustable to accommodate a variety of crib sizes and designs. Current clamping devices typically suffer from installation difficulties which compromise clamping strength and stability.

For example, a railing or crib are typically made of vertical spindles or slats mounted between an upper and a lower horizontal rail, such that the spindles or slats are typically spaced apart by a few inches. The thickness of the spindles or slats will vary among different crib designs. Therefore, clamps for attaching devices to the crib or railing must be designed to accommodate spindles and slats having a variety of different thickness. In addition, the upper horizontal rail is typically wider than the spindles or slats so that the rail overhangs the spindles or slats in the front and back. Therefore, clamps for attaching devices to the crib or railing must be designed to accommodate the overhang so that the mounted device will be oriented vertically. Moreover, a clamp should have an adjustable standoff because the amount by which the top railing overhangs the spindles or slats differs among various crib styles or designs.

In a typical design, a clamp includes a threaded shaft that projects horizontally from a lower end of the device, e.g., a mobile, being attached to a crib. The device is positioned adjacent to the side of the crib so that the threaded shaft passes between the vertical slats. A clamp nut, large enough to span the gap between the crib slats, is threaded onto the shaft and tightened to clamp the slats between the clamp nut and the lower end of the device. To accommodate an overhang of the upper horizontal rail, a threaded jam nut may be threaded onto the shaft prior to passing the shaft between the slats. The jam nut, which is also large enough to span the gap between the slats, is positioned on the shaft to provide the requisite standoff needed to accommodate the top rail overhang. The clamp nut is then tightened to clamp the slats between the large nut and the jam nut.

However, adjustment of the jam nut is typically awkward and time-consuming. End users may incorrectly adjust the jam nut when installing a mobile or other device on a crib, resulting in the mobile or other device being mounted at an angle instead of vertically. This may in turn result in improper operation of the mobile or in reduced aesthetics.

It would, therefore, be desirable to provide a clamp that is easier and faster to adjust and install without compromising clamping force. It would also be desirable to provide such a clamp that is attractive and inexpensive to manufacture.

SUMMARY OF THE INVENTION

The above, and other objects and advantages of the present are provided by an improved clamp having a shaft that is passed between the spindles or slats in a railing. A jam plate is disposed on the shaft such that it may slide along the length of the shaft to accommodate any offset of the top rail. A clamping nut is then placed on the shaft such that the spindles or slats are between the clamping nut and the jam plate. The clamping nut includes a portion designed to lock the jam plate in place such that is no longer free to slide along the length of the shaft. Tightening the clamping nut, therefore, clamps the spindles or slats between the clamping nut and the jam plate.

BRIEF DESCRIPTION OF THE DRAWINGS

The above, and other objects and advantages of the present invention will be understood upon consideration of the following detailed description taken in conjunction with the accompanying drawings, in which like reference characters refer to like parts throughout, and in which.

DETAILED DESCRIPTION

A clamp for attaching an object to a railing or similar structure is described below in connection with FIGS. 1–6. Illustratively, the clamp is described and shown in the context of mounting a mobile or other device to the side of a crib. However, it is to be understood that the present invention may also be useful for mounting other objects to railings, fences, partitions or other analogous structures. As an illustrative example, a clamp constructed according to the principles of the present invention may prove useful for mounting a flower box to a balcony railing.

Figure 1A:
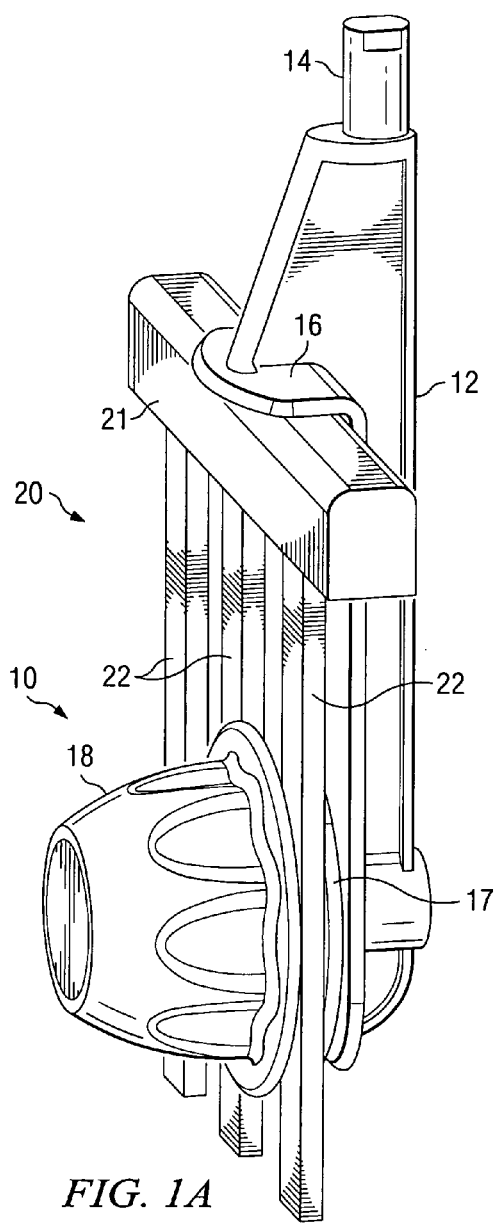
FIGS. 1A and 1B are, respectively, an oblique view of an illustrative embodiment of a clamp in accordance with the principles of the present invention installed on a crib, and a cross sectional view of the crib rail.

Referring to FIG. 1A, clamp assembly 10 is shown mounted to crib side section 20 made of top rail 21, spaced apart slats 22, and a bottom rail (not shown). Clamp assembly 10 includes main body 12 having attachment point 14 to which a crib accessory may be mounted. Attachment point 14 is illustratively shown as a short post disposed from an upper portion of main body 12, but may alternatively comprise a socket, slot, threaded shaft or hole, or other mechanism for attaching an object to main body 12. Preferably, main body 12 includes ledge 16 disposed from a side of main body 12, such that ledge 16 may be rested upon top rail 21 to vertically position fastening assembly 10. Clamp assembly 10 further includes jam plate 17 and clamp nut 18 disposed on a shaft (not shown in FIG. 1) extending horizontally from main body 12 and projecting between an adjacent pair of slats 22. Slats 22 are clamped between jam plate 17 and clamping nut 18 to secure clamp assembly 10 to crib side section 20.

Figure 1B:
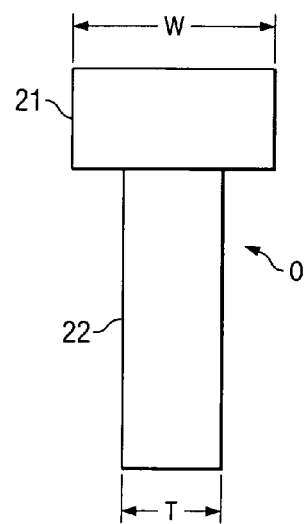
Figure 2:
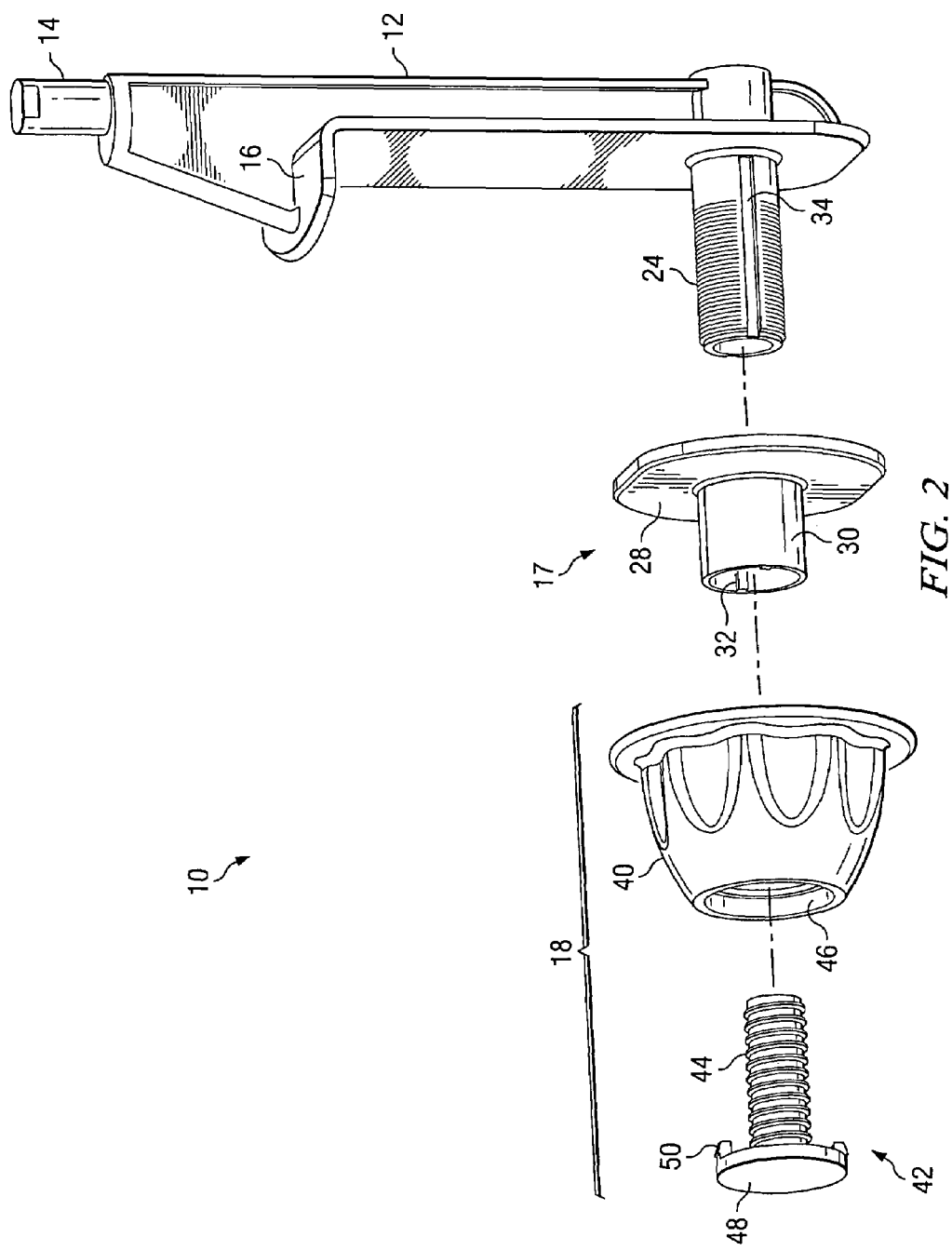
FIG. 2 is an exploded oblique view of the clamp of FIG. 1.
Figure 3:
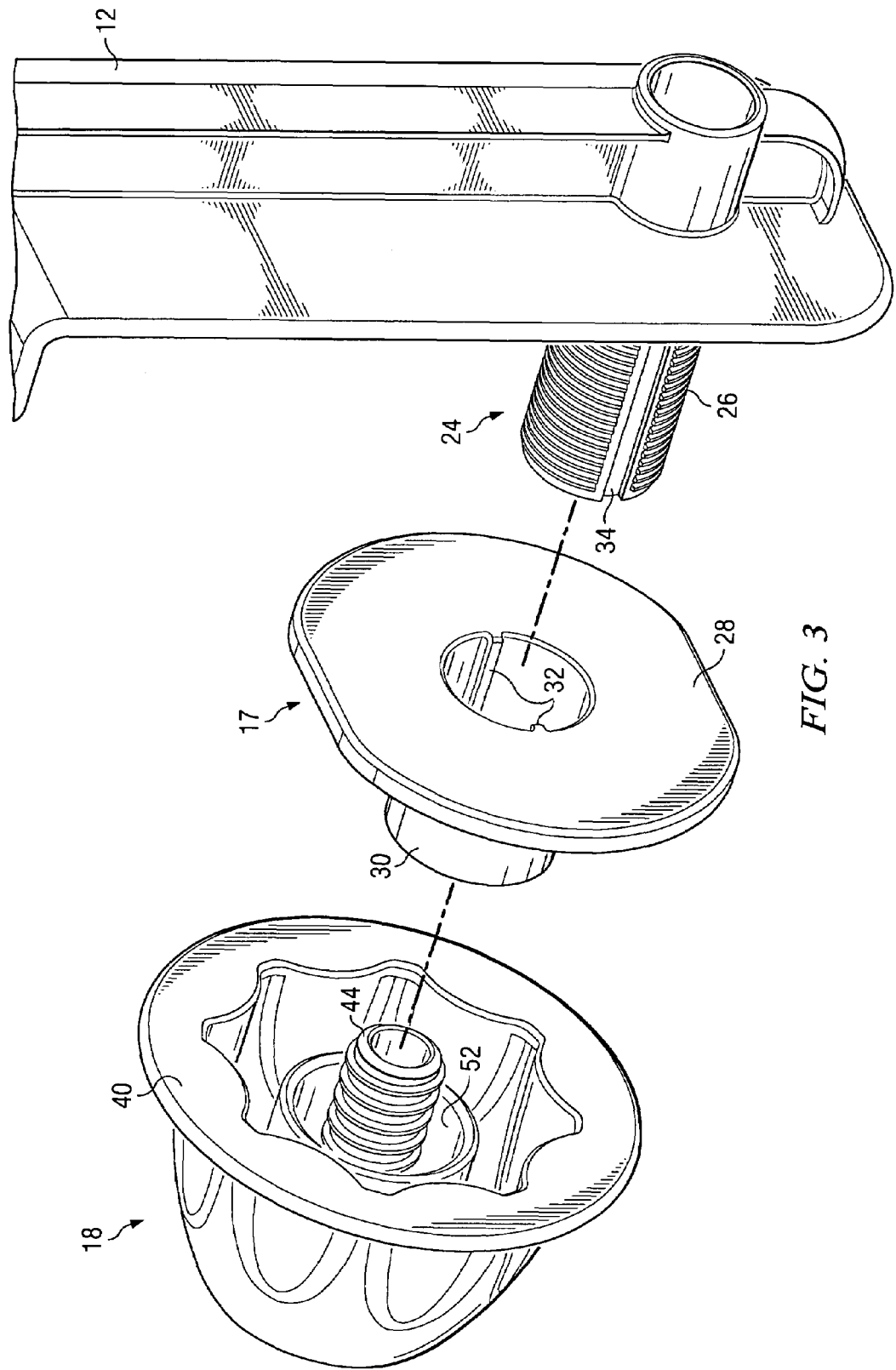
FIG. 3 is an oblique view of the clamp of FIGS. 1 and 2, from another view point.
Figure 4:
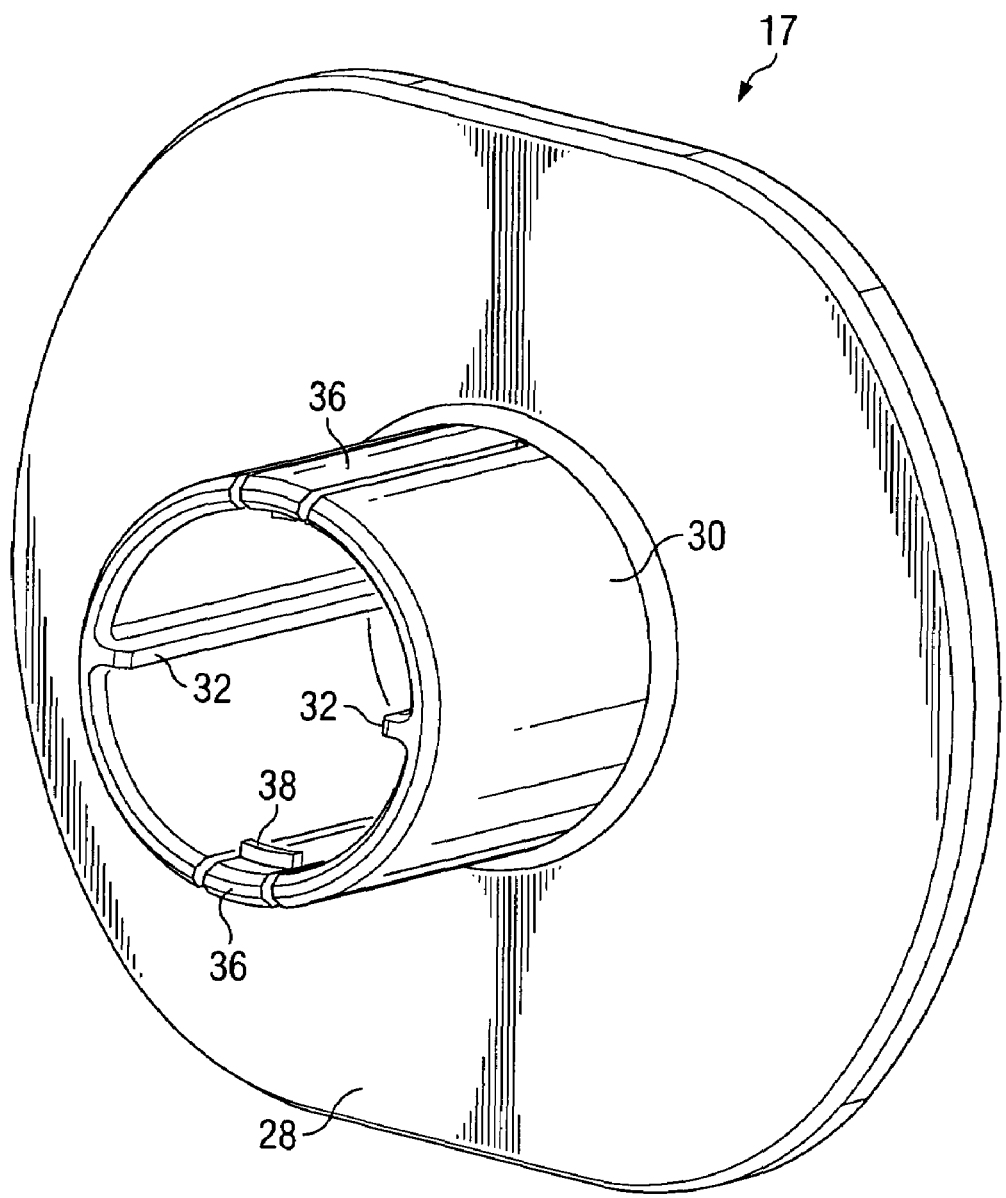
FIG. 4 is a detailed view of the jam plate of FIGS. 2 and 3.
Figure 5:
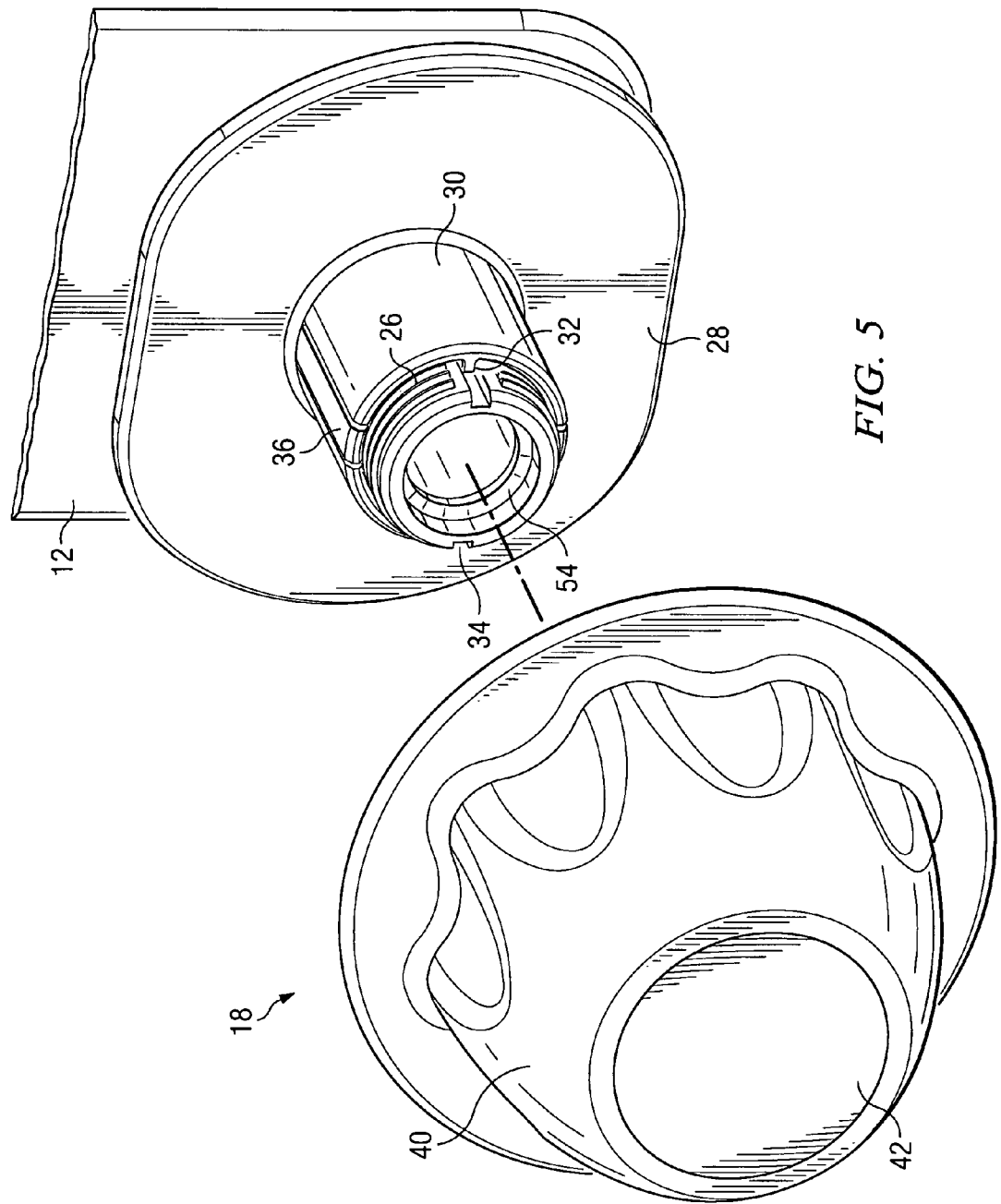
FIG. 5 is an oblique view of a partially assembled clamp.

As shown in FIG. 1B, the width W of top rail 21 may vary from one crib design to another, as can the thickness T of slats 22. As a result, the amount of overhang O may be different from one design to another. As will be described below, jam plate 17 may be adjusted to provide a standoff between slats 22 and a lower portion of main body 12 so that varying amounts of overhang can be accommodated by clamp assembly 10.

The construction of illustrative clamp assembly 10 is described below in connection with FIGS. 2 through 5, which show the component parts of clamp assembly 10 in more detail and from different viewpoints. As described above, clamp assembly 10 includes generally main body 12, jam plate 17, and clamp nut 18. Main body 12 includes shaft 24 disposed from a lower portion thereof. The diameter of shaft 24 is preferably selected to ensure adequate clamping forces may be applied to crib side portion 20 of FIG. 1, whereas the length of shaft 24 is selected to accommodate slats having a range of thickness.

Ridges 26 are disposed about shaft 24 and may be formed as raised portions of shaft 24 or as portions of shaft 24 between grooves formed in shaft 24. Preferably, ridges 26 comprise many parallel ridges disposed about shaft 24; however, ridges 26 may also comprise a threaded portion of shaft 24.

Jam plate 17, which includes flange 28 and sleeve 30, is adapted to fit over shaft 24 such that jam plate 17 may be moved along the length of shaft 24 to adjust a distance between main body 12 and jam plate 17. This allows a simple fast depth adjustment to be made. Guide rails 32 are provided on an interior surface of sleeve 30 and engage slots 34 of shaft 24. This prevents jam plate 17 from rotating relative to shaft 24.

Sleeve 30 incorporates flexible beam elements 36, each of which has one or more teeth 38. Preferably, teeth 38 have a profile corresponding to ridges 26 and has a rounded or inclined surface. Flexible beam elements 36 are adapted to bias teeth 38 so as to engage ridges 26 of shaft 24. However, the bias of flexible beam elements 36 is sufficiently low that flexible beam elements 36 may be deflected to enable teeth 38 to pass over ridges 26. Thus it is possible to achieve the proper offset adjustment by sliding jam plate 17 relative to main body 12. The interaction of flexible beams 36, teeth 38, and ridges 26 provides a pleasant "clicking" sensation as jam plate 17 is moved along shaft 24, and temporarily holds jam plate 17 in position during adjustment.

Preferably, clamping nut 18 comprises two pieces, including crown 40 and screw 42. The nature of external threads 44 on screw 42 makes it more costly to mold clamping nut 18 as one piece. Thus it is preferable to mold the crown 40 and screw 42 separately. Advantageously, this provides a possibility of molding crown 40 and screw 42 from materials having different characteristics, e.g., color, so as to provide additional decorative benefits. Socket 46 in crown 40 is provided to accept head 48 of screw 42. Screw 42 includes snap tangs 50 adapted to engage corresponding mounting holes (not shown in FIG. 2) in socket 46. The engagement of snap tangs 50 with the mounting holes prevents screw 42 from moving or turning relative to crown 40.

Internal threads 54 of shaft 24 provide engagement for threads 44 of screw 42. Crown 40 includes sleeve 52 which has an inner diameter large enough to fit over sleeve 30 of jam plate 17. When sleeve 40 passes over sleeve 30, flexing of flexible beams 36 is prevented, so that teeth 38 are not able to pass over ridges 26, and remain engaged with ridges 26. This prevents movement of jam plate 17 along the length of shaft 24. Thus, clamping nut 18 can be tightened down to clamp slats 22 between clamping nut 18 and flange 28 of jam plate 17.

Figure 6:
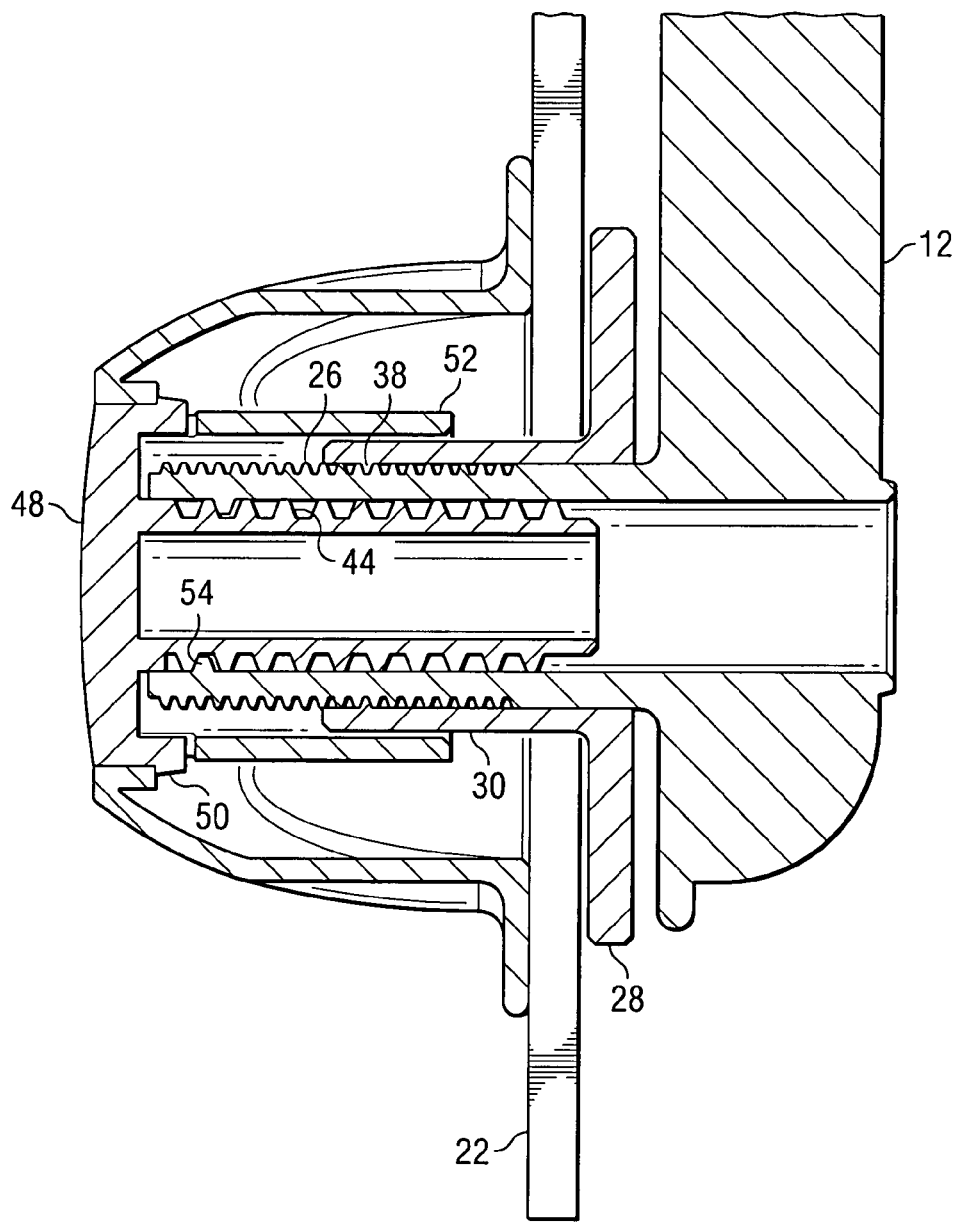
FIG. 6 is a sectional view of an assembled clamp constructed in accordance with the principles of the present invention.

FIG. 6 illustrates a section view of the clamping device mounted to a crib. Jam plate 17 is locked relative to main body 12 and shaft 24 by the engagement of teeth 38 and ridges 26. Sleeve 52 of nut 40 extends over flexible beams elements 36 preventing teeth 38 from passing over ridges 26. Internal threads 54 of shaft 24 engage external threads 44 of screw 42 to provide a clamp load against flange 28 of jam plate 17. FIG. 6 also illustrates snap tangs 50 of screw 42, which assemble screw 42 to crown 40. As stated above, screw 42 can be molded of a different material or color to provide a pleasant decorative effect.

When clamping nut 18 including crown 40 and screw 42 is loosened, sleeve 52 is withdrawn away from contact with sleeve 30 of jam plate 17. Thus jam plate 17 is free to slide over ridges 26 of shaft 24. This allows a simple fast depth adjustment to be made.

Once jam plate 17 is adjusted to the proper position, e.g., to accommodate an overhang in a top railing, clamping nut 18, including screw 42 is tightened to bring sleeve 52 into engagement with sleeve 30. This causes jam plate 40 to be locked into position relative to support 20. Preferably, crown 40, screw 42 and sleeve 52 are configured so that screw 42 engages threads 54 prior to sleeve 52 engaging sleeve 30, which in turn occurs prior to crown 40 applying clamping pressure to slats 22.

Thus, a clamp for attaching an object to the side of a crib has been disclosed. It will be readily apparent that the clamp thus disclosed may be useful for attaching an object to other analogous structures such as a fence, railing, balustrade, and the like. Accordingly, one will understand that the description provided herein is provided for purposes of illustration and not of limitation, and that the invention is limited only be the appended claims.

What is claimed is:

1. A clamp for attaching an item to a surface composed of spaced apart members, the clamp comprising:
   a shaft disposed from the item;
   a plate adapted to be slidably disposed from the shaft;
   a detent mechanism configured to interengage the plate and the shaft;
   wherein the detent mechanism comprises:
      a plurality of ridges disposed on a length of the shaft; and
      the detent mechanism comprises at least one tooth disposed from the plate and biased so as to interengage the plurality of ridges;
   a clamping nut adapted to be disposed on the shaft; and
   a locking mechanism for locking the detent mechanism when the clamping nut is disposed on the shaft.

2. The clamp of claim 1, wherein the detent mechanism further comprises a portion adapted to bias the at least one tooth against the plurality of ridges.

3. The clamp of claim 2, wherein the portion adapted to bias the at least one tooth against the plurality of ridges comprises a flexible beam from which the at least one tooth is disposed.

4. The clamp of claim 3, wherein the plate further comprises a sleeve extending from the plate and adapted to accept the shaft, the flexible beam being disposed from the sleeve.

5. The clamp of claim 4, wherein sleeve and shaft are adapted to prevent rotation of the sleeve about the shaft.

6. The clamp of claim 3, wherein the clamping nut is adapted to prevent flexing of the flexible beam, whereby interengagement of the at least one tooth and the plurality of ridges is ensured.

7. The clamp of claim 6, wherein the clamping nut includes a portion that is disposed adjacent to the flexible beams.

8. The clamp of claim 6, wherein the clamping nut includes a locking sleeve that fits over the flexible beams when the clamping nut is disposed from the shaft.

9. The clamp of claim 1, wherein the clamping nut and shaft further comprise corresponding threaded portions.

10. The clamp of claim 9, wherein the threaded clamping nut portion has external threads and the shaft has a hollow portion adapted to engage the external threads.

11. A method of attaching an item to a surface composed of spaced apart members, the method comprising:
providing a shaft disposed from the item;
slidably disposing a plate from the shaft;
providing a detent mechanism configured to interengage with the plate and the shaft;
wherein providing the detent mechanism comprises:
disposing a plurality of ridges on a length of the shaft;
disposing at least one tooth from the plate; and
biasing the tooth so as to interengage the plurality of ridges;
positioning the item so the shaft extends between two spaced apart members and the plate is disposed on a first side of the surface;
disposing a clamping nut on the shaft so that the clamping nut is disposed on a second side of the surface; and
providing a locking mechanism that locks the detent mechanism when the clamping nut is disposed on the shaft,
whereby the spaced apart members are clamped between the clamping nut and the plate.

12. The method of claim 11, wherein biasing the at least one tooth against the plurality of ridges comprises providing a flexible beam from which the at least one tooth is disposed.

13. The method of claim 12 further comprising:
providing a sleeve extending from the plate and adapted to accept the shaft; and
disposing the flexible beam from the sleeve.

14. The method of claim 13 further comprising preventing rotation of the sleeve about the shaft.

15. The method of claim 12, wherein proving a locking mechanism comprises preventing flexing of the flexible beam, so as to maintain interengagement of the at least one tooth and the plurality of ridges.

16. The method of claim 15, wherein proving a locking mechanism comprises providing the clamping nut with a portion that is disposed adjacent to the flexible beams.

17. The method of claim 16, wherein proving a locking mechanism comprises providing the clamping nut with a locking sleeve that fits over the flexible beams when the clamping nut is disposed from the shaft.

18. The method of claim 11 further comprising providing the clamping nut and shaft with corresponding threaded portions.

19. The method of claim 18 further comprising providing the threaded clamping nut portion with external threads and providing the shaft with a hollow portion adapted to engage the external threads.

\* \* \* \* \*